United States Patent [19]
Oguchi et al.

[11] Patent Number: 5,523,789
[45] Date of Patent: Jun. 4, 1996

[54] HIGH DEFINITION TELEVISION MONITOR FOR DISPLAYING VIDEO IMAGES REPRODUCED FROM NORMAL STANDARD VIDEO SIGNALS

[75] Inventors: Tomihiro Oguchi; Tutomu Henmi; Junichi Imai; Akihiro Ono; Tadashi Suzuki; Shinichi Ogura, all of Tokyo, Japan

[73] Assignee: Pioneer Electronics Corporation, Tokyo, Japan

[21] Appl. No.: 101,428

[22] Filed: Aug. 3, 1993

[30] Foreign Application Priority Data

Aug. 3, 1992 [JP] Japan ..................................... 4-206674

[51] Int. Cl.⁶ .............................. H04N 5/46; H04N 3/16; H04N 11/20
[52] U.S. Cl. .......................... 348/448; 348/458; 348/776; 348/805; 315/368.11
[58] Field of Search ............................. 358/11, 140, 242; 315/371, 368.11, 368.18, 368.21; 348/441, 448, 458, 776, 805; H04N 5/46, 3/16, 3/18, 11/20, 7/01

[56] References Cited

U.S. PATENT DOCUMENTS

| | | | |
|---|---|---|---|
| 3,825,793 | 7/1974 | Dietz | 315/27 |
| 4,679,091 | 7/1987 | Kikuchi et al. | 358/242 |

FOREIGN PATENT DOCUMENTS

| | | | |
|---|---|---|---|
| 58-81386 | 5/1983 | Japan | 358/140 |
| 292184 | 3/1990 | Japan | H04N 11/20 |

*Primary Examiner*—James J. Groody
*Assistant Examiner*—Cheryl Cohen
*Attorney, Agent, or Firm*—Perman & Green

[57] ABSTRACT

A high definition television monitor which raises the level of a convergence voltage by a predetermined voltage in one of two consecutive horizontal periods in which the same video signal is produced, writes the same video image twice on the same line during the consecutive 2H, thereby displaying a video image of the normal standard on a CRT display with a satisfactory picture quality.

10 Claims, 4 Drawing Sheets

5,523,789

HIGH DEFINITION TELEVISION MONITOR FOR DISPLAYING VIDEO IMAGES REPRODUCED FROM NORMAL STANDARD VIDEO SIGNALS

BACKGROUND OF THE INVENTION

1. Field of the Invention

The present invention relates to a high definition television monitor for displaying video images reproduced from normal standard video signals such as NTSC standard video signals on a CRT display or a projection television display.

2. Description of the Related Art

For a so-called Hi-vision television, which is a popular name of the high definition television, a standard different from that of the NTSC standard, so far applied to normal televisions, has been defined. For example, in the NTSC standard, the number of scanning line is 525; the horizontal synchronizing frequency is 15.75 KHz; and the aspect ratio (the ratio of the height to the width of the screen) is 3:4, while for the high definition television, the number of scanning line is 1,125; the horizontal synchronizing frequency is 33.75 KHz, and the aspect ratio is 9:16. Therefore, for receiving television broadcasting images of the NTSC standard, the Hi-vision television receivers are generally constructed to perform the horizontal scanning not only at 33.75 KHz but also at 15.75 KHz or to perform the horizontal scanning at a frequency of about 33 KHz, where the NTSC standard video signal is converted to a signal at 31.5 KHz by signal processing such as interpolation, twice writing or the like.

However, in the former case, for performing the horizontal scanning additionally at 15.75 KHz, a horizontal deflection circuit must be provided for each frequency, and a switching circuit for high voltages is also necessary, thereby incurring a problem of a raised cost. In addition, in the latter case, a video image represented by one of two consecutive lines in the screen is the same as that of the previous line. Namely, the video image by one line widens to two lines on the screen for every field, causing the degradation of the image quality particularly with respect to the vertical resolution.

SUMMARY OF THE INVENTION

It is therefore an object of the present invention to provide a high definition television monitor which is capable of displaying images reproduced by video signals of the normal standard at a low cost while preventing the degradation of the picture quality.

According to the present invention, there is provided a high definition television monitor for displaying a video image represented by a video signal of the normal standard on a CRT display which comprises means for generating convergence voltages for converging R, G and B (red, green and blue) light beams; voltage generator means for generating a predetermined voltage during one of two consecutive horizontal scanning periods in response to a horizontal synchronizing signal; and means for supplying a current to convergence coils of the CRT display in accordance with the convergence voltage and an output voltage of the voltage generator means, and is characterized in that a scanning line during the one horizontal scanning period of the two consecutive horizontal scanning periods is positioned at the same position as a scanning line during the other horizontal scanning period on the CRT display.

In the high definition television monitor of the present invention, the convergence voltage is raised by a predetermined voltage level in one of consecutive 2H, so that the same video image is written onto the same line twice in the consecutive 2H.

DETAILED DESCRIPTION OF THE PREFERRED EMBODIMENT

An embodiment of the present invention will hereinafter be described in detail with reference to the accompanying drawings.

Figure 1:
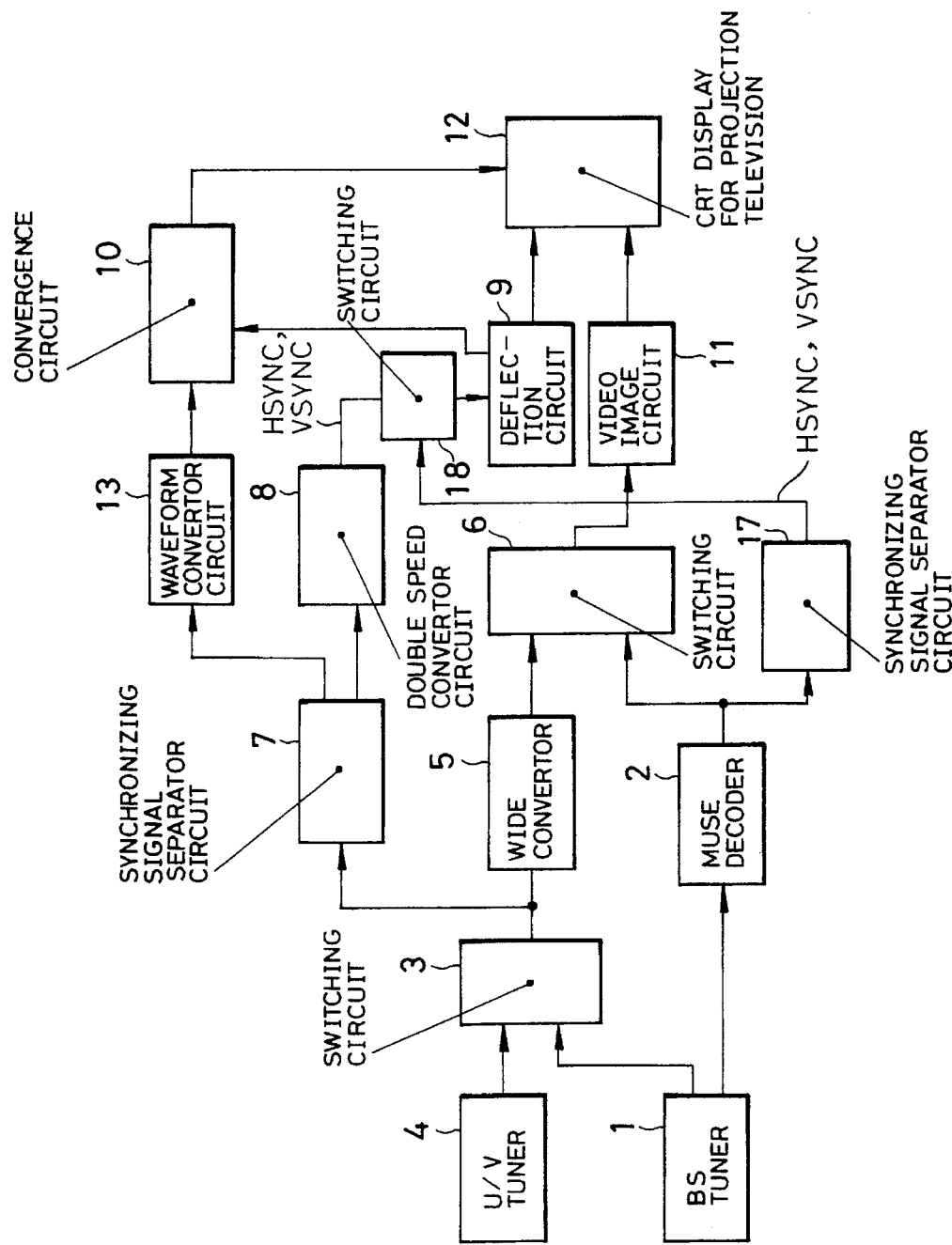
FIG. 1 is a block diagram showing an embodiment of the present invention.

In a high definition television monitor according to the present invention shown in FIG. 1, a BS (Broadcast Satellite) tuner 1 selects and demodulates a signal at a desired channel from received signals supplied from a BS convertor, not shown. The BS tuner 1 includes a function for a CS (Communication Satellite) tuner. The BS tuner 1 has two output terminals, one of which is used to output a MUSE signal which is a video signal bandwidth-compressed to 8.1 MHz when the Hi-vision television broadcasting is selected, and the other of which is used to output a NTSC standard video signal when the NTSC standard satellite broadcasting is selected. The BS tuner 1 is connected to a MUSE decoder 2 which restores a MUSE signal issued from the BS tuner 1 to an original RGB signal. A NTSC standard video signal is supplied to a switching circuit 3. A U/V (UHF/VHF) tuner 4 selects a signal at a desired channel from received television signals or surface waves received by an antenna, not shown, and restores the selected signal to output it as an NTSC standard video signal. The video signal issued from the U/V tuner 4 is supplied to the switching circuit 3. The switching circuit 3 selectively outputs one of the video signal issued from the BS tuner 1 and the video signal issued from the U/V tuner 4. The MUSE decoder 2 is connected to a synchronizing signal separator circuit 17 which extracts horizontal and vertical synchronizing signals HSYNC, VSYNC for the Hi-vision. These horizontal and vertical synchronizing signals are supplied to a deflection circuit 9 through a switching circuit 18 during receiving the Hi-vision television broadcasting.

The output of the switching circuit 3 is connected to a synchronizing signal separator circuit 7 which extracts a horizontal synchronizing signal and a vertical synchronizing signal individually from an NTSC standard video signal. The respective synchronizing signals of the NTSC signal generated from the synchronizing signal separator circuit 7 are supplied to a double speed convertor circuit 8. The double speed convertor circuit 8 comprises, for example, a PLL (Phase Locked Loop) circuit, and converts the horizontal synchronizing signal to a signal at the double frequency (31.5 KHz) while outputting the vertical synchronizing signal at 60 Hz as it is. The respective output signals of the double speed convertor circuit 8 are supplied to the deflection circuit 9 through the switching circuit 18 as the synchronizing signals HSYNC, VSYNC for the Hi-vision during receiving the NTSC standard television broadcasting. A waveform convertor circuit 13 generates a square wave control signal at 15.75 KHz with a duty ratio of 50% from the horizontal synchronizing signal of the NTSC standard. The control signal is supplied to a convergence circuit 10. The convergence circuit 10 is also supplied with a signal for creating a parabolic waveform from the deflection circuit 9.

The output of the switching circuit 3 is also connected to a wide convertor 5. The wide convertor 5 serves to adapt an image of the NTSC standard to the screen size of the Hi-vision television, the aspect ratio of which is 9:16. The wide convertor 5 digitizes a video signal for each of luminance and color difference signals, writes the digitized signals into a memory in the line units, reads out the written signals twice at a double speed to convert them to luminance and color difference signals having a horizontal synchronizing frequency at 31.5 KHz, and then converts the finally created signals to analog signals. Output signals of the wide convertor 5 are supplied to a switching circuit 6, wherein they are selectively switched with an output signal of the MUSE decoder 2. The output of the switching circuit 6 is connected to a video image circuit 11. The video image circuit 11 drives a CRT display 12 for the Hi-vision television in accordance with a signal selectively issued from the switching circuit 6.

Figure 2:
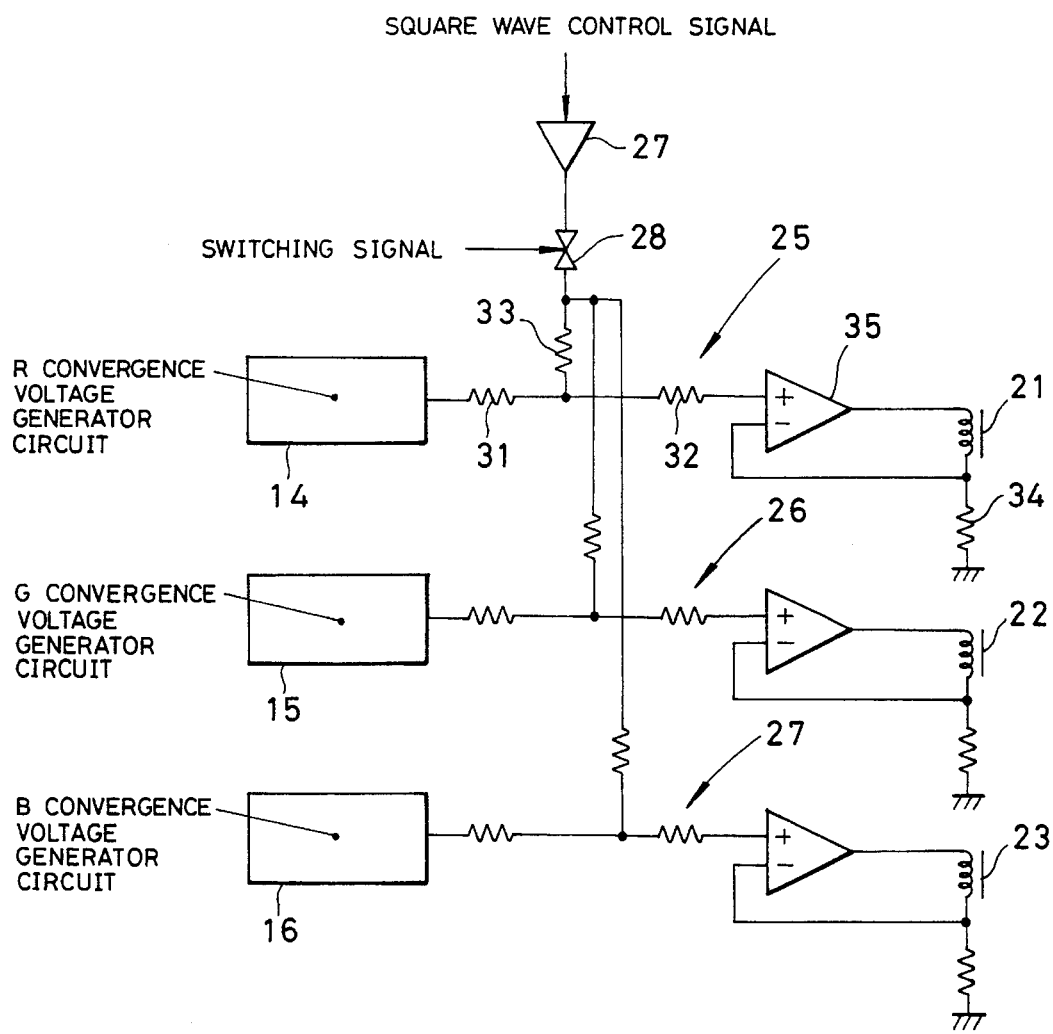
FIG. 2 is a schematic circuit diagram showing a convergence circuit.

The convergence circuit 10 is provided with driving circuits 25–27 for driving convergence coils 21–23 for R, G and B signals, respectively, as shown in FIG. 2. The convergence circuit 10 is supplied with the square wave control signal from the waveform convertor circuit 13. The control signal is supplied to the respective driving circuits 25–27 through a buffer amplifier 27 and a switch 28. The switch 28 is turned off when the Hi-vision broadcasting is being received, and turned on when the NTSC standard television broadcasting is being received. A switching signal for turning on and off the switch 28 may be generated by a means, not shown, in accordance with a channel selection made by a user or automatically in accordance with a selected video signal. The driving circuit 25 comprises resistors 31–33 and a drive amplifier 35 having an operational amplifier. A convergence voltage supplied from a convergence voltage generator circuit 14 is supplied to a positive input terminal of the drive amplifier 35 through the resistors 31, 32. An output voltage of the switch 28 is applied to a line, to which the registers 31, 32 are connected, so that it is added to the convergence voltage. The convergence coil 21 and a resistor 34 are connected in series between an output terminal of the drive amplifier 35 and the ground, and the drive amplifier 35 is supplied at its negative input terminal with a terminal voltage of the resistor 34. The drive amplifier 35 operates such that a voltage at the negative input terminal becomes equal to a voltage at the positive input terminal, whereby a correction current corresponding to a voltage applied to the positive input terminal is supplied to the convergence coil 21. The configuration of the driving circuits 26, 27 are similar to that of the driving circuit 25 except that the driving circuits 26, 27 are connected to convergence voltage generator circuits 15, 16, respectively. The convergence voltage generator circuits 14–16 generate previously set convergence voltages for each dot (pixel) of R, G, B colors, respectively.

The switching circuits 3, 6, 18 are controlled by a control circuit, not shown, in accordance with a manipulation of a user for switching the broadcasting to be received.

In the configuration described above, during receiving the Hi-vision television broadcasting, a MUSE signal issued from the BS tuner 1 is supplied to the MUSE decoder 2 to be restored to a RGB signal. The RGB signal is supplied to the video image circuit 11 through the switching circuit 6, while the respective synchronizing signals are supplied to the deflection circuit 9 through the switching circuit 18. In this manner, a Hi-vision broadcasting video image is displayed on the CRT display 12. In this event, the convergence voltage generator circuits 14–16 individually generate convergence voltages. Since the switch 28 is off during receiving the Hi-vision television broadcasting, convergence currents only corresponding to the convergence voltages flow through the convergence coils 21–23, thus correcting a distorted image on the screen of the CRT display 12.

Namely, each of the convergence coils 21–23 has horizontal and vertical convergence coils (not shown) by which a green light beam on the screen is based on an adjusting point and red and blue light beams are projected on the screen and converged on the point. A mixed voltage waveform by the horizontal and vertical convergence coils is shown in FIG. 3. However, the convergence coils 21–23 shown in FIG. 2 correspond to the vertical convergence coils.

On the other hand, during receiving the NTSC standard television broadcasting, a video signal issued from the BS tuner 1 or the U/V tuner 4 is supplied to the wide convertor 5 through the switching circuit 3. The wide convertor 5 converts a NTSC standard video signal to a RGB signal having a horizontal synchronizing frequency at 31.5 KHz. During consecutive two horizontal periods, i.e., 2H (2/31.5 KHz) of the RGB signal, the same signal is repeated. The RGB signal is supplied to the video image circuit 11 through the switching circuit 6. Also, the synchronizing signal components in the video signal issued from the switching circuit 3 are extracted by the synchronizing signal separator circuit 7 and supplied to the double speed convertor circuit 8. The double speed convertor circuit 8 converts the horizontal synchronizing signal to a signal at 31.5 KHz and passes the vertical synchronizing signal at 60 Hz therethrough without conversion. These synchronizing signals from the double speed convertor circuit 8 are supplied to the deflection circuit 9 through the switching circuit 18. Thus, in the deflection circuit 9, vertical and horizontal deflection coils 12a, 12b are supplied with deflection currents in accordance with the horizontal synchronizing signal and the vertical synchronizing signal issued from the double speed convertor circuit 8.

From the waveform convertor circuit 13, the square wave control signal at 15.75 KHz with a duty ratio of 50% is simultaneously supplied to the convergence circuit 10. The control signal is at a predetermined voltage only for 1H period per 2H. Since the switch 28 of the convergence circuit 10 is on during receiving the NTSC standard television broadcasting, the control signal is supplied to the driving circuits 25–27 through the buffer amplifier 27 and the switch 28. Explaining in connection with the driving circuit 25, the control signal is supplied through the resistor 33 to the line to which the resistors 31 and 32 are connected. The line with the resistors 31, 32 connected thereto is supplied with a convergence voltage from the convergence voltage generator circuit 14, so that the predetermined voltage is added to the convergence voltage only for 1H period per 2H. Also, in the driving circuits 26, 27, the predetermined voltage is added to the convergence voltage only for 1H period per 2H, similarly to the driving circuit 25. Since the predetermined voltage corresponds to a voltage for deflecting an electron beam on the CRT display 12 upwardly by one scanning line interval on the screen, the same line is scanned for consecutive 2H, and such scanning is repeated.

Figure 3A:
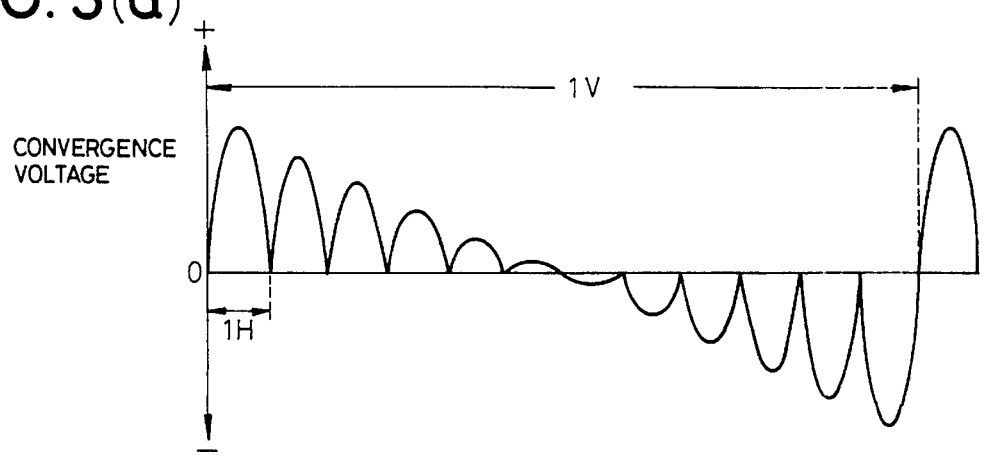
FIGS. 3(a) to 3(c) are waveform charts showing operating waveforms at corresponding locations in the circuits shown in FIGS. 1 and 2.
Figure 3B:
Figure 3C:
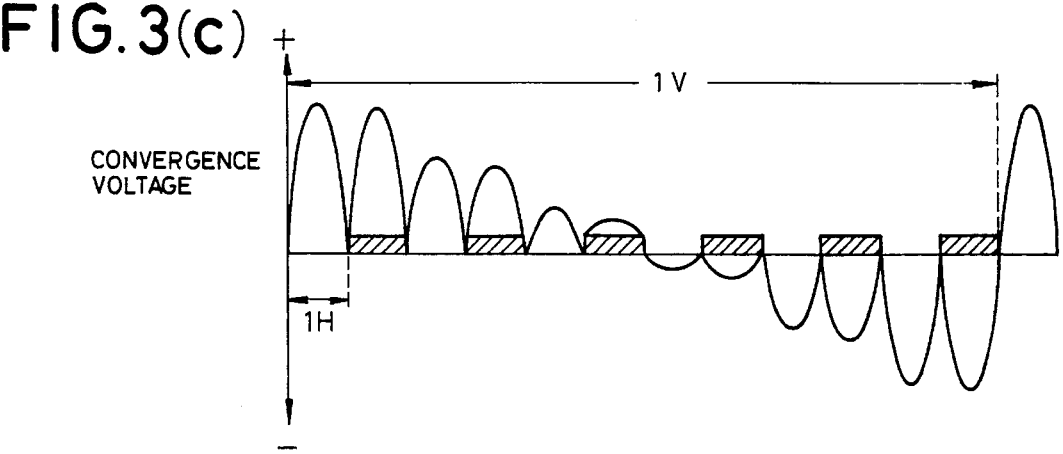
Figure 4:
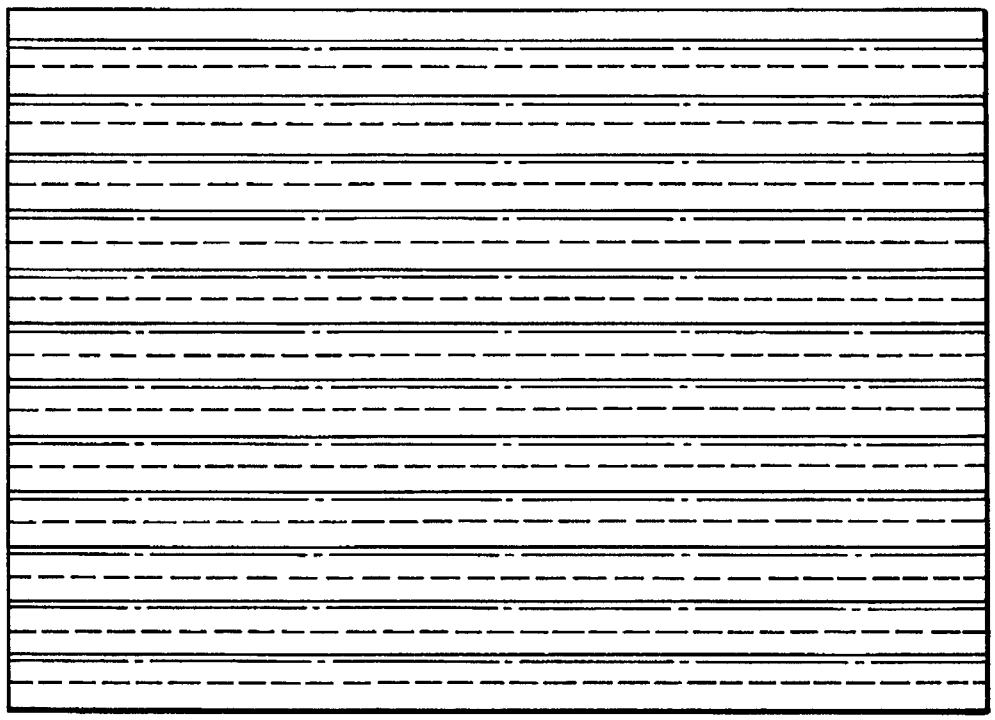
FIG. 4 is a diagram for explaining scanning of the screen.

FIG. 3(a) shows a convergence voltage waveform for correcting pin-cushion distortion. Although the number of scanning lines is 1,125 (1,125/2 in one field) for the Hi-vision television, only 12 scanning lines are drawn in one field in the drawing for facilitating the understanding. Specifically, the convergence voltage presents a plurality of mountain-like waveforms of 1H duration, the peak voltages of which gradually decrease during 1V (one vertical scanning period), where lines above the center of screen are at positive levels, while lines below the center of the screen are at negative levels. The signal having such a waveform, applied to the convergence coil, serves to correct pin-cushion distortion. The square wave control signal issued from the waveform convertor circuit 13 is at the predetermined voltage on even-numbered lines as shown in FIG. 3(b). Since the predetermined voltage is added to the convergence voltage presenting the mountain-like waveforms, a voltage supplied to the respective drive amplifiers in the driving circuits 25–27 on even-numbered lines is raised by the predetermined voltage (hatched portions) as shown in FIG. 3(c). Therefore, on the screen of the CRT display 12, odd-numbered lines must be present as indicated by solid lines in FIG. 4, while even numbered lines must be positioned as indicated by broken lines in FIG. 4. However, by adding the predetermined voltage to the convergence voltage, the even-numbered lines are positioned at the same positions as the odd-numbered lines of 1H before, as indicated by one-dot chain lines (in FIG. 4, the one-dot chain lines are drawn below the solid lines for facilitating the understanding).

In one field, the convergence coil is added with the predetermined voltage when the odd-numbered line is scanned, in the next field, the convergence coil is added with the predetermined voltage when the even-numbered line is scanned. Such twice writing operation is repeated for every two fields.

It is understood that the convergence voltage is not, of course, limited to the waveform shown in FIG. 3(a), but may be another voltage waveform. Namely, it may be a first order waveform (saw tooth waveform), a second order waveform (parabolic waveform), a third order waveform, . . . or a sixth order waveform as the convergence adjusting waveform. The horizontal and vertical convergence coils are finally supplied with a waveform mixed by using such a convergence adjusting waveform. In the present invention, the vertical convergence coil is added with the voltage waveform shown in FIG. 3(b), as a result, the waveform shown in FIG. 3(c) is formed.

Also, while in the foregoing embodiment, a video image is reproduced in accordance with a video signal issued from the BS tuner or the U/V tuner, the present invention may also be applied to a high definition television monitor which displays a video image in accordance with a video signal from a playing apparatus such as a video disk player and a video tape recorder.

Although the projection television monitor having three CRTs for R, G and B have been described in the foregoing description of the embodiment, the present invention may also be applied to a television monitor having a CRT to be directly watch. In this case, as dynamic convergence correction, a waveform signal adding a V(vertical)-saw tooth waveform and a V-parabolic waveform is added to a pulse signal in synchronism with the horizontal synchronizing signal from the waveform convertor circuit 13 and is further added with an H(horizontal)-parabolic waveform in the H-blanking pulse from the synchronizing signal separator circuit 7. By supplying the added waveform the convergence yoke through a dynamic convergence amplifier, the object of the present invention is achieved.

According to the high definition television monitor of the present invention as described above, a convergence voltage is raised by a predetermined voltage level during one of consecutive 2H in which the same video signal is produced, whereby the same video image is written twice on the same line of the screen. The video image by one line is maintained within one line and does not widen to two lines on the screen for every field. Also, the video image by one line is maintained for every frame. Thus, the configuration of the convergence circuit only need be modified for allowing a video image represented by a NTSC standard video signal to be reproduced by the high definition television monitor. Further, the display of inexact video images due to line interpolation or the like is avoided, so that video images of NTSC standard signals can be displayed with a satisfactory picture quality at a low cost.

What is claimed is:

1. A high definition television monitor for displaying a video image represented by a video signal of the normal standard on a CRT display, comprising:

means for generating convergence voltages for converging R, G and B (red, green and blue) light beams;

voltage generator means for generating a predetermined voltage during one of two consecutive horizontal scanning periods in response to a horizontal synchronizing signal in said video signal; and means for supplying a current to convergence coils of said CRT display in accordance with said convergence voltage and an output voltage of said voltage generator means, wherein a scanning line during said one horizontal scanning period of said two consecutive horizontal scanning periods is positioned at the same position as a scanning line during the other horizontal scanning period on said CRT display.

2. A high definition television monitor according to claim 1, wherein said video signal is an ATV (Advanced Television) signal.

3. A high definition television monitor according to claim 1, wherein said television monitor is a three-tube type projection television monitor.

4. A high definition television monitor according to claim 1, further comprising horizontal and vertical deflection coil circuits, wherein a spatial combination of an electromagnetic field generated by said horizontal and vertical deflection coil circuits with an electromagnetic field generated by said convergence coils is used to perform horizontal and vertical scanning.

5. A high definition television monitor according to claim 1, wherein said voltage generator means generates, as said output voltage, a voltage which is equal to said convergence voltage with a pulse wave corresponding to a vertical shift amount of one horizontal scanning portion added thereto.

6. A high definition television monitor as in claim 1 further comprising a deflection circuit for supplying horizontal and vertical deflection currents to horizontal and vertical deflection coils.

7. A method of displaying a video image represented by a video signal of the normal standard on a CRT display which has a deflection circuit for supplying a horizontal deflection current to a horizontal deflection Coil and a vertical deflection current to a vertical deflection coil, comprising the steps of:

determining whether an input video signal is a signal having a first horizontal synchronizing frequency or a signal having a higher second horizontal synchronizing frequency;

shortening a horizontal scanning period of a deflection circuit and supplying convergence coils with a current weighted by one horizontal scanning line portion for every horizontal scanning period if said input video signal is a signal having the first horizontal synchronizing frequency; and supplying said video signal to said CRT display through a video circuit.

8. A method of displaying a video image according to claim 7, wherein said horizontal scanning period is shortened to half if said input video signal is a signal of the NTSC standard in the shortening step.

9. A high definition television monitor having a CRT display to be directly watch for displaying a video image represented by a video signal of the normal standard on said CRT display, comprising:

means for separating a horizontal blanking signal and a vertical blanking signal from said video signal;

means for obtaining a vertical parabolic waveform signal and a vertical saw tooth waveform signal from said vertical blanking signal and for generating a vertical convergence signal;

means for obtaining a horizontal parabolic waveform signal from said horizontal blanking signal and for generating a horizontal convergence signal;

convergence drive means for mixing said vertical convergence signal and horizontal convergence signal and for supplying the mixed signal to a convergence yoke; and means for converting a horizontal synchronizing signal in said video signal to a signal at the double frequency if said video signal is a signal having a low horizontal synchronizing frequency and then for adding a predetermined voltage to said vertical convergence signal only for one horizontal scanning period of two consecutive horizontal scanning periods of the horizontal synchronizing signal having the double frequency.

10. A high definition television monitor as in claim 9 further comprising a deflection circuit for supplying horizontal and vertical deflection currents to horizontal and vertical deflection coils.

* * * * *